United States Patent [19]

Joon-Yoen

[11] Patent Number: 4,743,727
[45] Date of Patent: May 10, 1988

[54] TURNTABLE DRIVE UNIT FOR A MICROWAVE OVEN

[75] Inventor: Whang Joon-Yoen, Kyungsangnam-Do, Rep. of Korea

[73] Assignee: Goldstar Co., Ltd., Seoul, Rep. of Korea

[21] Appl. No.: 38,057

[22] Filed: Apr. 14, 1987

[30] Foreign Application Priority Data

Apr. 14, 1986 [KR] Rep. of Korea ............... 864945[U]

[51] Int. Cl.$^4$ .............................................. H05B 6/78
[52] U.S. Cl. ..................... 219/10.55 F; 219/10.55 E;
219/512; 108/20; 126/338; 99/443 R
[58] Field of Search ............... 219/10.55 F, 10.55 E,
219/10.55 R, 512; 108/20, 139; 126/338;
99/443 R

[56] References Cited

U.S. PATENT DOCUMENTS 4,254,319  3/1981  Beh et al. ...................... 219/10.55 F
4,625,087 11/1986 Jurgensen et al. ........... 219/10.55 F
4,631,379 12/1986 Aoyama ....................... 219/10.55 F
4,635,610  1/1987 Nakanishi .................... 219/10.55 E Primary Examiner—Philip H. Leung
Attorney, Agent, or Firm—Birch, Stewart, Kolasch & Birch

[57] ABSTRACT

A turntable drive unit of a microwave oven which comprises a spring box disposed below floor of the cooking chamber in the microwave oven, the spring box containing a shape memory alloy plate spring disposed therein, an axle mounted to the spring box through one end thereof and the other end thereof mounted to a food platform, and a shape memory alloy coil spring disposed in the spring box, one end of the coil spring connected to an air control plate disposed in the spring box whereby the food plateform can be automatically rotated by varying the temperature in the cooking chamber in the microwave oven and varying the temperature in the spring box.

6 Claims, 3 Drawing Sheets

TURNTABLE DRIVE UNIT FOR A MICROWAVE OVEN

BACKGROUND AND SUMMARY OF THE INVENTION

The present invention relates to a turntable drive unit for use in microwave oven and more particularly, to a turntable drive unit for a microwave oven, which utilizes a shape memory alloy instead of a conventional drive motor. The shape memory alloy of the present invention deforms with the variation of temperature in a cavity and causes the rotative movements of the turntable.

Turntable drive units are known which utilize a motor which operates only with power supply for the driving turntable to rotate.

According to a prior art drive unit as shown in FIG. 2, an axle 5 of a turntable 2 is arranged to engage with the axle 11 of a high torque motor 4 and is mounted to an axial guiding member 7 having a slide bushing 8 between the axial guiding member 7 and the axle 5 for reduction of friction during rotation for driving to rotate itself. The axial guiding member 7 is to be kept by washers 9 and 10 from the separation.

However, since the eventual high load of such a drive unit requires an employment of a high torque motor which comprises a number of components to eventually bring up the cost price and the work hours for assembling, the prior art drive unit can be provided poor productivity and long delivery term of products.

Therefore, the device of the present invention eliminates such drawbacks of the prior art drive unit and is provided with a drive device without a motor. The drive unit of the present invention comprises a plate spring of a shape memory alloy which deforms to a certain limitation of the range in accordance to the variation of the temperature, and a coil spring of the same alloy, which is linked to an air adjusting plate. The air adjusting plate controls by means of air supply so that the temperature of the spring box makes to cause the expansion or contraction of the springs for the rotative operation of the turntable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
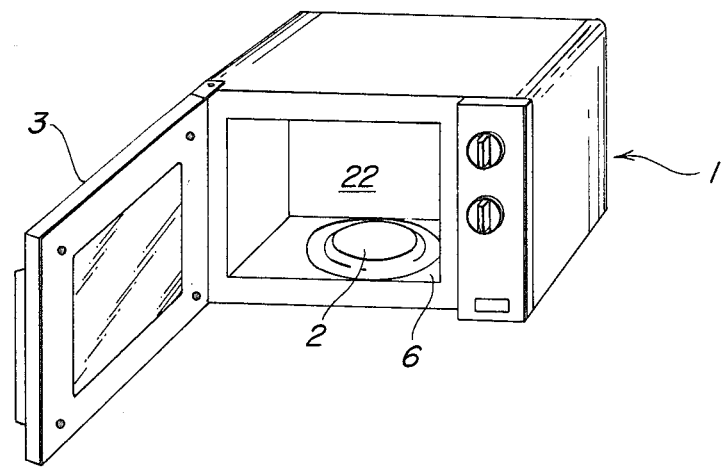
FIG. 1 is a perspective view of a microwave oven including the turntable drive unit of the present invention.
Figure 2:
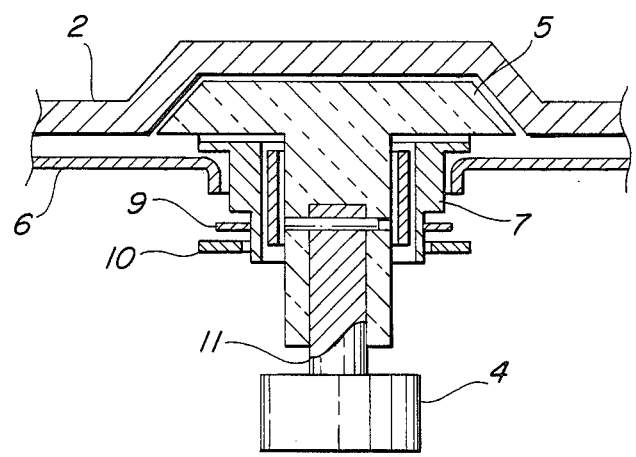
FIG. 2 is a sectional view of the prior art turntable drive unit.

Referring now in detail to the drawings for the purpose of illustrating the present invention, the microwave oven 1, as shown in FIG. 1, contains a microwave oscillator and is provided with a cooling chamber 22 having a door 3 disposed in the front portion and a turntable 2 disposed on the bottom floor thereof for keeping cooking objects.

Figure 3:
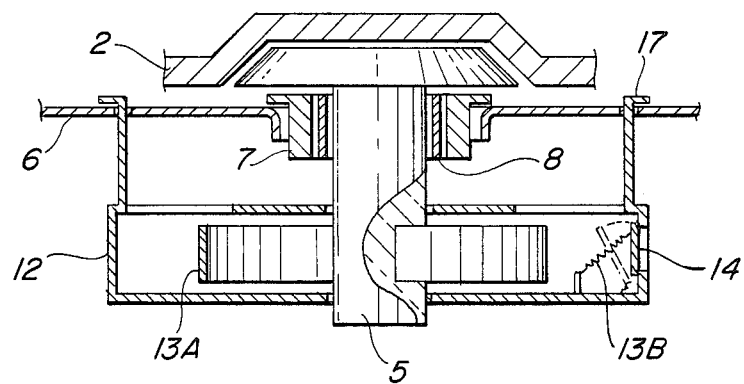
FIG. 3 is a sectional view of a turntable drive unit of the present invention.
Figure 5:
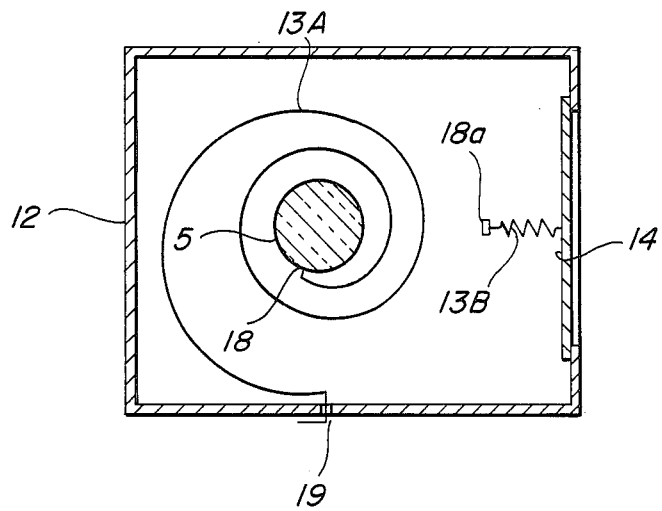
FIG. 5 is a sectional view of springs of shape memory alloy arranged within a box of the present invention.

As shown in FIG. 3, an axle 5 of the turntable 2 is arranged to be rotatably inserted into a spring box 12 by means of a slide bushing 8 and an axial guiding member 7. Fasteners 17 are disposed on top of the spring box 12 to attach the spring box 12 on to the floor 6 of the cooking chamber 22. Within the spring box 12 there are placed a plate spring 13A, which is fixed into the spring box 12 and the axle 5 disposed at respective ends by means of respective fitting holes 18 and 19 (FIG. 5). A coil spring 13B which is fastened to the spring box 12 and to an air adjusting plate 14 by fastening member 18a. The plate spring 13A is spirally wound around along the axle 5 as shown in FIG. 5 and the coil spring 13B is formed in an ordinary coil shape.

Figure 4:
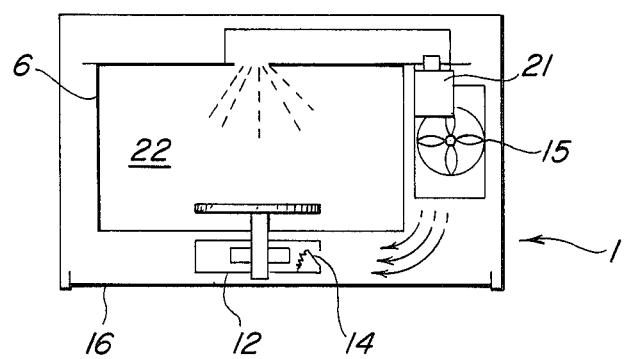
FIG. 4 shows the air flow in the microwave oven.
Figure 6:
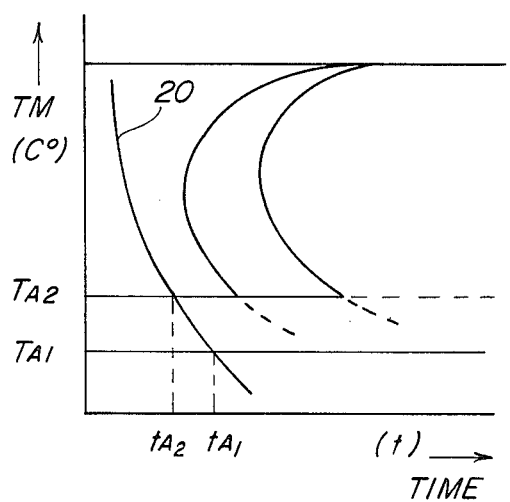
FIG. 6 diagrammatically shows a deformation curve chart of a plate spring of the shape memory alloy.

According to the present invention, the microwave generated by an oscillator 21 moves into the cooking chamber 22, in the same manner as air flows in a microwave oven (FIG. 4). At this time, where the turntable 2 absorbs the wave to generate the heat which, in turn, heats the axle 5. Then, the heat is transferred from the axle 5 to the plate spring 13A being attached to the axle 5. When temperature rises over TA1 as shown in FIG. 6, the plate spring 13A begins to deform and cause the expansion and stretching of the plate spring 13A as illustrated in a deformation curve 20.

The action of expansion of the plate spring 13A pulls the counter-clockwise and the axle 5 of the turntable 2 causes the rotation of the turntable 2 while a further rise of temperature over TA2 of the chart stops the deformation and interrupts the rotation of the turntable 2.

Figure 7:
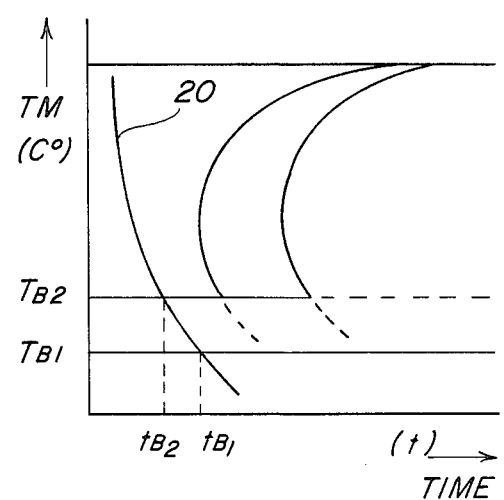
FIG. 7 diagrammatically shows a deformation curve chart of the coil spring of the shape memory alloy.

However, a continued rise in temperature of the spring box 12 over the temperature TB1 (TB1>TB2), as shown in FIG. 7 results in the contraction of the coil spring 13B as illustrated in the deformation curve 20 to open an air adjusting plate 14 in cool by supplying air through a fan 15 into the spring box 12 and cool the plate spring 13A. Consequently, the cooling of the shape memory alloy of the spring 13A to below TA2 causes the spring to begin contraction to rotate clockwise the turntable 2 in standstill. And the further cooling of the temperature to below TA1 results in interruption of the contraction to cause the turntable 2 to stop the rotation.

When the continued decrease of the temperature of the spring box 12 becomes below TA2, the TA1 results in stretching of the coil spring 13B to cause the air adjusting plate 14 to shut the spring box 12 and raise the temperature in the spring box.

Repetition of such reciprocal actions is to cause another repetition of the reciprocal back and forth rotation of the turntable 2 placed within the cooking chamber 22 to enable food to be cooked disposed on the table to receive uniformly treatment through the microwave applied.

The temperature and time for deformation of the plate springs 13A and 13B and the section of them and the size of the air adjusting plate are to influence the range of the turning motion of the turntable 2. The larger the range is the better the performance.

The device of the present invention eliminates the use of a drive motor and replaces the shape memory alloy which deforms its physical shape to a limited range of the expansion or contraction in accordance to the variation of the temperature, and the device of the present invention is connected to the turntable to cause it to rotate by the action of the expansion and contraction of the shape memory alloy to constitute a drive unit.

The effect of the device of the present invention is to reduce the process steps of assembling and the cost price, and enhance productivity and performance of the microwave oven.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A turntable drive unit comprising:
   a turntable platform for supporting a food product to be heated,
   a spring box disposed below said turntable platform,
   a shaft member in operative engagement at one end with said turntable platform with the other end thereof extending into said spring box,
   a first shape memory alloy spring attached to said shaft member within the spring box,
   an aperture disposed in said spring box, said aperture provided with a door member, and
   a second shape memory alloy spring attached to said door member whereby upon an increase in the temperature of the spring box containing the first shape memory alloy spring, the said first shape memory alloy spring causes the turntable platform to rotate in one direction and upon further increasing of the temperature of the spring box, the second shape memory alloy spring opens the door member for cooling the spring box, said cooling of the spring box causing the first shape memory alloy spring to rotate in the opposite direction.

2. The turntable drive unit of claim 1 wherein the first shape memory alloy spring is spirally wound around the shaft member.

3. The turntable drive unit of claim 1 wherein the second shape memory alloy spring is formed in an ordinary coil.

4. A microwave oven comprising:
   a cooking chamber,
   means for introducing microwave energy into said cooling chamber,
   a turntable attached to a shaft member and rotatably disposed within said cooking chamber,
   a spring box provided at the bottom of the cooking chamber, said shaft member extending into said spring box,
   a first shape memory alloy spring attached to said shaft member within the spring box,
   an aperture disposed in said spring box, said aperture provided with a door member, and
   a second shape memory alloy spring attached to said door member whereby upon an increase in the temperature of the spring box containing the first shape memory alloy spring, the said first shape memory alloy spring causes the turntable platform to rotate in one direction and upon further increasing of the temperature of the spring box, the second shape memory alloy spring opens the door for cooling the spring box, said cooling of the spring box causing the first shape memory alloy spring to rotate in the opposite direction.

5. The microwave oven of claim 4 wherein the first shape memory alloy spring is spirally wound around the shaft member.

6. The microwave oven of claim 4 wherein the second shape memory alloy spring is formed in an ordinary coil.

* * * * *